United States Patent [19]

Yamamoto et al.

[11] Patent Number: 4,476,634

[45] Date of Patent: Oct. 16, 1984

[54] CYLINDER GAUGE

[75] Inventors: Takeshi Yamamoto; Masao Nakahara, both of Kawasaki, Japan

[73] Assignee: Mitutoyo Mfg. Co., Ltd., Tokyo, Japan

[21] Appl. No.: 422,417

[22] Filed: Sep. 23, 1982

[30] Foreign Application Priority Data

Oct. 23, 1981 [JP] Japan .......................... 56-157825[U]

[51] Int. Cl.³ .......................... G01B 3/26; G01B 5/12
[52] U.S. Cl. .................. 33/178 R; 33/147 K
[58] Field of Search ................. 33/147 K, 178 R

[56] References Cited

U.S. PATENT DOCUMENTS

| | | | |
|---|---|---|---|
| 2,253,803 | 8/1941 | Newberry | 33/178 R |
| 2,424,497 | 7/1947 | Nilsson | 33/178 R |
| 2,443,880 | 6/1948 | Aldeborgh et al. | 33/178 R |
| 2,601,496 | 6/1952 | Boat | 33/147 K |
| 3,422,540 | 1/1969 | Worthen | 33/178 R |
| 3,882,604 | 5/1975 | Macklyn | 33/147 K |

FOREIGN PATENT DOCUMENTS

| | | | |
|---|---|---|---|
| 889696 | 7/1953 | Fed. Rep. of Germany | 33/178 R |
| 419983 | 4/1947 | Italy | 33/178 R |

*Primary Examiner*—Richard R. Stearns
*Attorney, Agent, or Firm*—Flynn, Thiel, Boutell & Tanis

[57] ABSTRACT

A cylinder gauge capable of comparing and measuring a diameter of a hole of a workpiece.

This cylinder gauge comprising a spindle, a head receiving the bottom portion of the spindle, a measuring element inserted into the head and linearly movable in the radial direction of the spindle, and a guide member slidably provided on the head and abutting the measuring element in a vertical state against a surface to be measured, wherein a first spring for biasing the measuring element outwardly is provided on the side of the spindle and a second spring for biasing the guide member outwardly is provided above the axis of the measuring element, so that the diameter of a shallow hole can be measured.

6 Claims, 3 Drawing Figures

CYLINDER GAUGE

BACKGROUND OF THE INVENTION

1. Field of the Invention

This invention relates to a cylinder gauge for measuring a diameter of a hole or the like of a workpiece.

2. Description of the Prior Art

A head portion housing therein a measuring element and the like in the conventional cylinder gauge is of such arrangement as shown in FIG. 1. More specifically, in the drawing, an anvil 2 is detachably mounted to one end (to the left in the drawing) of a head 1 through a box nut 3, and a measuring element 4 is slidably provided at the other end of this head 1. Coupled onto this measuring element 4 is a compression coil spring 5, which constantly biases the measuring element 4 into the head 1. The head 1 is slidably provided at the other end thereof with a guide member 6 for causing the measuring element 4 to abut against the inner wall surface of the workpiece, not shown, in its vertical state. Confined between this guide member 6 and the head 1 is a compression coil spring 7, which constantly biases the guide member 6 outwardly from the head 1, and the guide member 6 is stopped by a stopper 1A integrally, threadably coupled into the head 1. Further, the inner end of the measuring element 4 is abutted against one end of a spindle 9 through an L-shaped cam 8 whose central portion is rotatably supported by the head 1, whereby an axial movement of the spindle 9 is imparted to the measuring element 4 as its movement in the radial direction of the spindle 9. The other end of this spindle 9 is connected to an indicating device such as a dial gauge, not shown, and the spindle 9 is axially, movably incorporated in a cylinder body 1B.

As described above, in the cylinder gauge having the conventional construction, two springs 5 and 7 as being the biasing means are provided around the measuring element 4, a substantially cylinder-shaped guide member 6 is provided, and further, in order to connect the spindle 9 to the measuring element 4 through a cam 8 or a link, not shown, large sizes and forms are needed for the head 1 and the guide member 6, both of which are centered about the axis of the measuring element 4, and, even if limitation is imposed on the design, the distance between the axis of the measuring element 4 and the bottom end, in the drawing, of the guide member 6 comes to be about 10 mm. In consequence, in measuring a diameter of the bottom of a shallow hole, blind hole or the like, there has been presented such a disadvantage that the diameter of a portion spaced apart about 10 mm or less from the bottom of the hole, blind hole or the like, because the bottom end, in the drawing, of the guide member 6 abuts against the bottom of the hole.

SUMMARY OF THE INVENTION

The present invention has as its object the provision of a cylinder gauge capable of measuring the diameter of a shallow hole, blind hole or the like, which is close to the bottom.

To achieve the above-described object, the present invention contemplates in that a measuring element and a spindle are abutted against each other with their inclined surfaces, a first biasing means for projecting the measuring element is provided on the side of the spindle, and a second biasing means for biasing a guide member slidable on the head, in a direction of projecting the guide member, is provided at a position closer to the indicating device than the axis of the measuring element, so that the distance between the axis of the measuring element and an end face of the head on the side of the indicating device can be minimized.

DETAILED DESCRIPTION OF THE INVENTION

Description will hereunder be given of an embodiment of the cylinder gauge according to the present invention with reference to the drawings.

Figure 1:
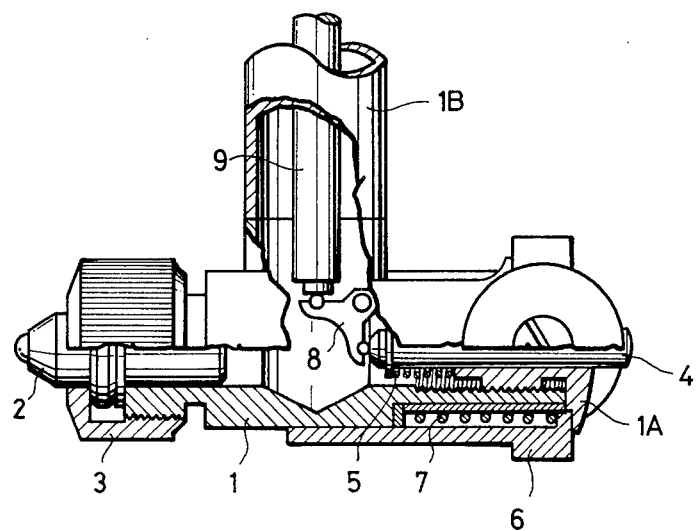
FIG. 1 is a front view, partially sectioned, showing the head portion in the conventional cylinder gauge.
Figure 2:
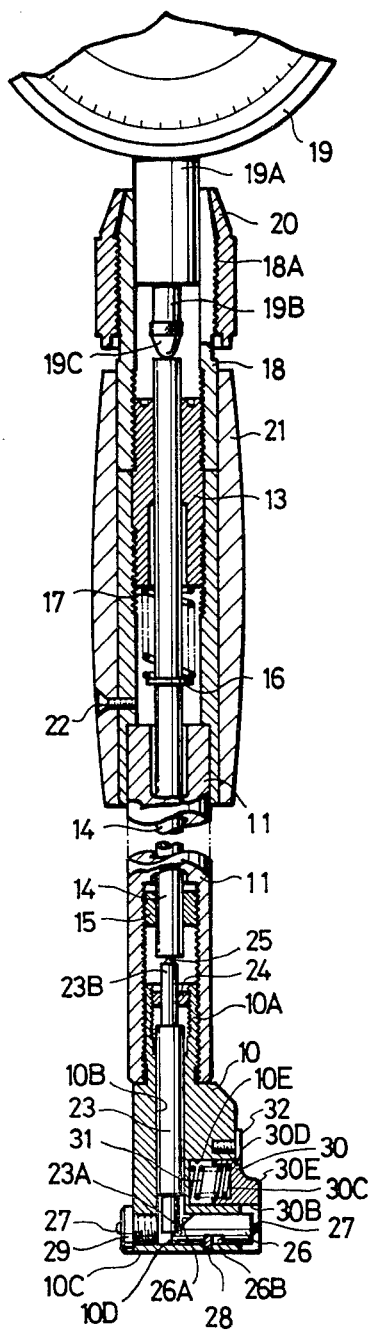
FIG. 2 is a sectional view, partially not shown, illustrating an embodiment of the cylinder gauge according to the present invention.

In FIG. 2 showing the general arrangement, an externally threaded portion 10A is formed on the upper end portion of a head 10, an end of a cylinder body 11 is threadably coupled onto this externally threaded portion 10A, and an inner cylinder 12 is solidly secured to the other end of this cylinder body 11 by a suitable means such as press fitting or bonding. An internally threaded portion is formed on the upper inner side surface, in the drawing, of this inner cylinder 12, and a first guide 13 is threadably coupled into this internally threaded portion. A spindle 14 is inserted into the first guide 13, the inner cylinder 12 and the cylinder body 11, and this spindle 14 is brought into sliding contact at the upper end portion, in the drawing, thereof with the first guide 13, and also brought into sliding contact at the lower end portion, in the drawing, thereof with a second guide 15 threadably coupled into the cylinder body 11, whereby the spindle 14 is axially, movably incorporated therein. Furthermore, a compression coil spring 17 as being a first biasing means is confined between a C-ring 16 engaged with the intermediate portion of the spindle 14 and the first guide 13, and the spindle 14 is constantly biased by this spring 17 downwardly in the drawing.

A dial gauge holder 18 is threadably coupled onto an externally threaded portion formed on the upper end portion, in the drawing, of the first guide 13, and a stem 19A of a dial gauge 19 being as the indicating device is inserted into the holder 18. This stem 19A is clamped by a plurality of slots 18A formed in the upper end portion, in the drawing, of the holder 18 and a clamp nut 20 threadably coupled onto an externally threaded portion formed on the outer periphery of a portion formed with the slots 18A, so as to be solidly secured to the holder 18. In this case, the stem 19A is suitably adjusted in mounted height thereof relative to the holder 18, so that the forward end of a tip 19C affixed to the forward end of a measuring spindle 19B of the dial gauge 19 can be abutted against the end face of the spindle 14 under a predetermined measuring pressure.

A handgrip 21 made of cast iron, synthetic resin or the like is coupled onto the inner cylinder 12 and solidly secured thereto by means of a screw 22.

The head 10 is penetratingly provided therein with a first hole 10B extending along the axis of the externally threaded portion 10A thereof, and a lower spindle 23 formed at the bottom end thereof with an obliquely sectioned tapered surface 23A is slidably inserted into this hole 10B in the axial direction of the spindle 14. The upper portion of the lower spindle 23 is formed into a small diameter portion 23B, and the peripheral surface of this small diameter portion 23B is brought into sliding contact with and guided by a small diameter portion guide 24 threadably coupled into the upper end portion of the head 10. Additionally, a ball 25 having a small diameter is interposed between the top end face of the small diameter portion 23B and the bottom end face of the spindle 14, whereby the spindle 14 and the lower spindle 23 are interlocked in a point-to-point contact.

A bottom surface 10C of the head 10 is formed into a plain surface, and the head 10 is penetratingly provided in the lower portion thereof with a second hole 10D communicated with and perpendicularly intersecting the first hole 10B. A measuring element 26 is linearly movably inserted into this second hole 10D in a direction perpendicular to the spindle 14, i.e., in the radial direction of the spindle 14. A steel ball 27 for making a point-to-point contact to a workpiece, not shown, is solidly secured to the central portion of the outer end face of this measuring element 26 in a semi-submerged state. On the other hand, a tapered surface 26A obliquely sectioned so as to meet the tapered surface 23A of the lower spindle 23 is formed on the inner end face of the measuring element 26, and this tapered surface 26A is abutted against the tapered surface 23A of the lower spindle 23 downwardly biased through the spindle 14 by the compression coil spring 17, whereby the measuring element 26 is biased to be projected from the head 10.

As described above, the compression coil spring 17 functions as the biasing means for causing the measuring element 26 to project in the radial direction of the spindle 14.

A groove 26B is formed on the outer peripheral surface of the measuring element 26, and the forward end of an engaging plate 28 pressed in from the bottom surface 10C of the head 10 is engaged with this groove 26B, whereby a forward limit stopper and a rearward limit stopper for the measuring element 26 are constituted by the engaging plate 28 and the groove 26B.

When the measuring element 26 is inserted into the head 10, a substantially mushroom-shaped anvil 29 is threadably coupled, accorded with the axial direction of the measuring element 26, into a portion of the head 10 opposite to the measuring element 26, and a steel ball 27 for making a point-to-point contact to the workpiece is solidly secured to the central portion of this anvil 29 in a semi-submerged state.

Figure 3:
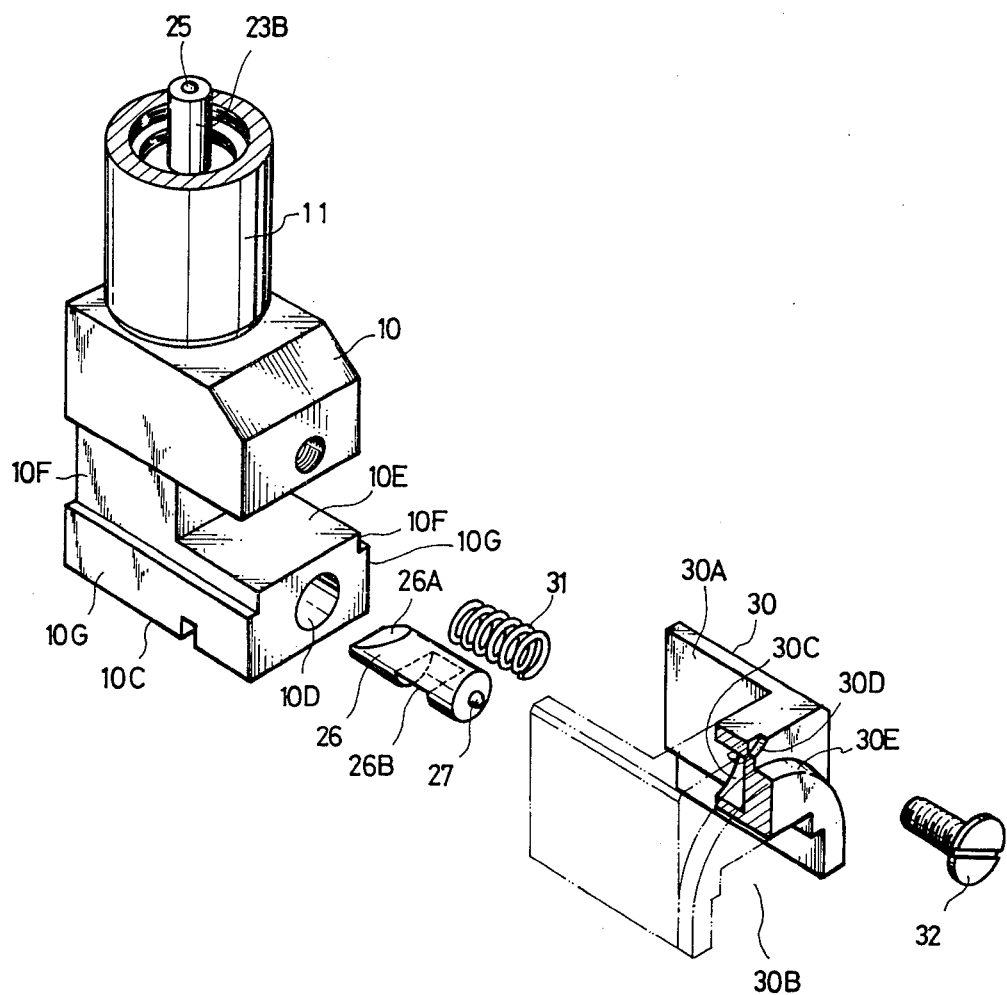
FIG. 3 is a disassembled perspective view showing the head portion in FIG. 2.

A guide member 30 slidable in the linearly moving direction of the measuring element 26 is provided rightwardly of the head 10 in the drawing. More specifically, as shown in FIG. 3, the head 10 is provided at the central portion of the end face thereof on the side of the measuring element 26 with a groove 10E having an opening directed in the horizontal direction. This groove 10E is substantially a lying U shape in looking from sideways, grooves 10F perpendicularly intersecting this groove 10E are formed on opposite side surfaces of the head 10, and the top edges of the grooves 10F on the opposite side surfaces meet the top edge of the groove 10E, but, the bottom edges of the grooves 10F are lower than the bottom edges of the groove 10E. Furthermore, the guide member 30 is formed with a groove 30A having an opening directed in the vertical direction, whereby the guide member 30 is formed into a substantial U shape in plan view. Further, the guide member 30 is provided in the lower portion thereof with a groove 30B perpendicularly intersecting this groove 30A and downwardly opening. This groove 30B has a width across the inner ends (of the upper portion) equal to the width of the groove 30A and a width across the outer ends (of the lower portion) being wider than the width of the groove 30A. The groove 30A has a width substantially equal to a width across the bottom surfaces of the two grooves 10F formed on the opposite side surfaces of the head 10, and the wider width of the lower portion of the groove 30B is made equal to a width across the front and rear walls 10G of the lower portion of the head 10. With the above-described arrangement, the portion of the groove 30A of the guide member 30 can be coupled onto the portions of the grooves 10F of the head 10, and the portion of the groove 30B can be coupled onto the front and rear walls 10G of the lower portion of the head 10, whereby the bottom walls of the grooves 10F, and the front and rear walls 10G of the head 10 constitute guide surfaces for the guide member 30. Further, the guide member 30 is formed into a substantial gate shape symmetrical with respect to the center axis of the measuring element 26 and covering the measuring element 26 from above in looking from right and forward in FIG. 3. The opening end edges of the gate shape extend downwardly from the center axis of the measuring element 26, i.e., to a side opposite to the dial gauge. In this case, the vertical width of the grooves 10F of the head 10 is made equal to a width across the top surface of the guide member 30 and the bottom surfaces of the wider width portions of the groove 30B, whereby the guide member 30 is guided in the vertical direction.

A compression coil spring 31 as being a second biasing means is confined between the guide member 30 and the head 10, one end portion of this spring 31 is inserted into a blind hole 30C formed in the guide member 30, and the guide member 30 is constantly biased in a direction of projecting from the head 10 through the resiliency of this spring 31. Furthermore, an arcuate cutout 30D is formed at the top end portion of the guide member 30, and this cutout 30D is abutted against the peripheral edge of a head of a screw 32 threadably coupled into the head 10, whereby a stopper for the guide member 30 in the projecting direction thereof is formed.

A substantially semicircular raised portion 30E is integrally formed on the right side surface, in the drawing, of the guide member 30, and this raised portion 30E is centered about the axis of the measuring element 26, symmetrical in looking from sideways in the drawing, formed to a position downwardly of the axis of the measuring element 26, and the peripheral edge of this raised portion 30E is chamfered and smoothed. The peripheral edge of this raised portion 30E is abutted against a surface to be measured. At this time, the guide member 30 is adjusted in its movement, so that the measuring element 26 can abut against the surface to be measured in the vertical state.

In order to measure an inner diameter of the workpiece by use of the present embodiment having the above-described arrangement, operation should be performed in the same manner as with the conventional cylinder gauge commonly used.

More specifically, an anvil 29 suitable for the dimension of an inner diameter of the workpiece is mounted on the head, a dimension as being a reference is set on the dial gauge 19 by use of a ring gauge, a micrometer or the like. Subsequently, the handgrip 21 is held and the portion of the head 10 is inserted into the workpiece with the head 10 being slightly tilted, the raised portion 30E of the guide member 30 is abutted against the surface to be measured against the resiliency of the compression coil spring 31, and adjustment is effected to abut the measuring element 26 against the surface to be measured in the vertical state. In this case, two steel balls 27 and 27 are abutted against the surfaces to be measured, the measuring element 26 is retracted in accordance with the dimension of the inner diameter of the workpiece against the biasing force of the compression coil spring 17. The spindles 23 and 14 are pushed up through the tapered surfaces 23A and 26A, whereby the value of this retraction is indicated by the dial gauge 19, so that the dimension of the inner diameter of the workpiece can be measured.

In the present embodiment with the above-described arrangement, the compression coil spring 17 biasing the measuring element 26 as being the first biasing means and the compression coil spring 31 biasing the guide member 30 as being the second biasing means are provided upwardly of the axis of the measuring element 26, whereby the distance between the axis of the measuring element 26 and the bottom surface 10C of the head 10 is minimized, so that even the diameter of a shallow hole, blind hole or the like, which is close to the bottom can be measured. Furthermore, the two tapered surfaces 23A and 26A are utilized as the means for changing the direction of linear movement of the measuring element 26 through an angle of 90°, and hence, construction is simplified as compared with the conventional construction using the link or the like, so that the number of man-hour needed for finishing can be decreased, the number of man-hour needed for assembling can be reduced to a considerable extent, and the general configuration can be rendered compact in size. Further, there is no need for providing a slot for allowing a link to move in the head 10 as seen in the conventional construction using the link, whereby substantially a hermetically sealed construction is adoptable, so that a dust excluding effect can be improved. Furthermore, a biasing means such as a spring is not directly provided on the measuring element 26, and the measuring element 26 is biased only through the spindle 14, so that the distance between the axis of the measuring element 26 and the bottom surface 10C of the head 10 can be decreased from this reason as well. Further, the guide member 30 is brought into contact with the head 10 at two or more surfaces including the bottom surfaces of the grooves 10F on the opposite side surfaces of the head 10, the front and rear walls 10G and so forth, so that the guide member 30 can effect control in position in the lateral and the vertical direction and smooth operation can be performed.

In addition, in the above-described embodiment, the dial gauge 19 is shown as the indicating device, however, there is no intention to limit the invention to the specific form disclosed, but this specific form may be replaced by an electric digital indicator or other devices. Furthermore, in the above-described embodiment, the dial gauge holder 18 formed with the slots 18A and the clamp nut 20 are adopted as the means for fixing the dial gauge 19, however, there is no intention to limit the invention to the specific form disclosed, but this specific form may be replaced by other means such for example as a fixing means including a dial gauge holder formed with slots, a ring coupled to the outer periphery of a portion of the holder formed with the slots and a locking screw threadably coupled into the ring, for pressing the dial gauge holder. In the specific forms disclosed, the tapered surfaces 23A and 26A of the lower spindle 23 and the measuring element 26 are formed into the obliquely sectioned forms, but may be formed into circular truncated cones. Further, the compression coil spring 17 as being the biasing means for projecting the measuring element 26 in the radial direction of the spindle 14 is provided in the inner cylinder 12, there is no intention to limit the invention to the specific form disclosed, the compression coil spring 17 may be provided in the cylinder body 11 or the head 10. In short, the compression coil spring 17 must be provided on the side of the spindle 14. Furthermore, in the above-described embodiment, the spindle 14 and the lower spindle 23 are separately formed, but may be formed integrally. However, when the spindle 14 and the lower spindle 23 are separately formed as in the above-described embodiment, such advantages can be offered that assembling of the portion of the head 10 and assembling of the portion of the inner cylinder 12 can be performed separately of each other to improve the workability in assembling and the inner cylinder 12 and the spindle 14 are variable in length.

As has been described hereinabove, according to the present invention, such an advantage can be offered that a cylinder gauge capable of measuring the diameter of a shallow hole, blind hole or the like, which is close to the bottom.

What is claimed is:

1. A cylinder gauge for measuring holes, including shallow holes, in workpieces, comprising:
   a head;
   a cylinder body extending fixedly upward from said head;
   means for securing an indicating device to the upper end of said cylinder body;
   a spindle operatively connected to said indicating device and axially movable along said cylinder body;
   a measuring element slidably supported on said head for axial movement in the radial direction of said spindle, said measuring element engaging said spindle for mutual axial movement, the bottom end of said spindle and the inner end of said measuring element having inclined surfaces at which said spindle engages said measuring element for converting an axial movement of said measuring element into an axial movement of said spindle;
   a first biasing means operatively connected to said spindle for biasing said measuring element in a direction for projecting from said head and thereby for biasing the outer end of said measuring element to abut against the inner wall surface of a hole in a workpiece for measuring such hole;
   a guide member slidably mounted on said head in a direction parallel to the axis of said measuring element;
   a second biasing means for biasing said guide member in a direction projecting from said head;
   the bottom of said head being flat and substantially perpendicular to the axis of said cylinder body, said measuring element being axially slidable in a bore closely adjacent to the flat bottom of said head and substantially parallel thereto, to facilitate measurement of even very shallow holes in workpieces;
   interengaging groove means on said head and guide member for slidably guiding said guide member on said head in a direction substantially parallel to the axis of said measuring element, said guide member protruding from said head in the same direction as said measuring element, said measuring element having an outer end portion facing away from said head, said guide member having an outer end portion also facing away from said head, the outer end portion of said guide member having an outer end surface extending in a plane substantially perpendicular to the measuring element axis and substantially parallel to the spindle axis, the measuring element and guide member having rest positions in which the outer end portion of said guide member overlies and protectively covers the outer end portion of said measuring element.

2. A cylinder gauge as set forth in claim 1, wherein the outer end portion of said guide member forms a downward opening recess which overlies the top and bilaterally symmetrically flanks the sides of the outer end portion of the measuring element in the rest positions of the guide member and measuring element, the bottom edge of the guide member being offset downward beyond said measuring element to at least near the bottom of said head to define the bottom opening of said recess, said measuring element being contained in said recess in said rest positions of said measuring element and guide member, said guide member being retractable from its rest position to allow axial protrusion therefrom of said measuring element.

3. A cylinder gauge as set forth in claim 2 in which the outer end portion of said guide member is formed as a raised portion contoured for engaging the surface of a hole in a workpiece upon insertion of said head into said hole with the axis of said cylinder body being tilted somewhat away from the axis of said hole in a direction toward the outer end portion of said guide member, said guide member being retractable toward said head with said head in said hole and said cylinder body substantially parallel to the axis of said hole for permitting the outer end portion of said measuring element to engage the side of said hole for measuring said hole.

4. A cylinder gauge as set forth in claim 1 including a groove formed in the outer periphery of said measuring element and an engaging plate inserted through a portion of said head opposed to said groove for engaging said groove and limiting the axial movement of said measuring element with respect to said head.

5. A cylinder gauge for measuring holes, including shallow holes, in a workpiece, comprising:
a head;
a cylinder body extending fixedly upward from said head;
means for securing an indicating device to the upper end of said cylinder body;
a spindle operatively connected to said indicating device and axially movable along said cylinder body;
a measuring element slidably supported on said head for axial movement in the radial direction of said spindle, said measuring element and spindle having coactive means for converting axial movement of said measuring element into axial movement of said spindle;
first biasing means for biasing said measuring element axially outward of said head toward the surface of a hole in a workpiece to be measured;
a guide member slidable on said head and second biasing means for urging said guide member away from said head, said guide member being of generally U-shaped plan which opens toward said head and has an upstanding bight portion connecting the outer ends of a pair of spaced legs, guide means interengaging said legs and head for slidably guiding said guide member on said head for movement of said bight portion toward and away from said head along a direction substantially parallel to the axis of said measuring element, said legs and bight portion extending from below the outer end of said measuring element over the top thereof so as to form a protective arch around the major part of the circumference of the outer end portion of the measuring element.

6. A cylinder gauge as set forth in claim 5 in which said bight portion has on its outer surface a raised portion extended away from said head and capable of engaging the side wall of a hole in a workpiece to be measured upon insertion of said cylinder gauge in said hole with said cylinder body tilted somewhat with respect to the axis of said hole in a direction toward the bight portion, said bight portion having a downwardly opening recess sized to permit outward extension of the outer end portion of said measuring element therethrough during measurement of the size of a hole in a workpiece.

* * * * *